May 14, 1946.   W. E. MATHI   2,400,244
CALCULATING MACHINE
Filed Aug. 25, 1941   9 Sheets-Sheet 2
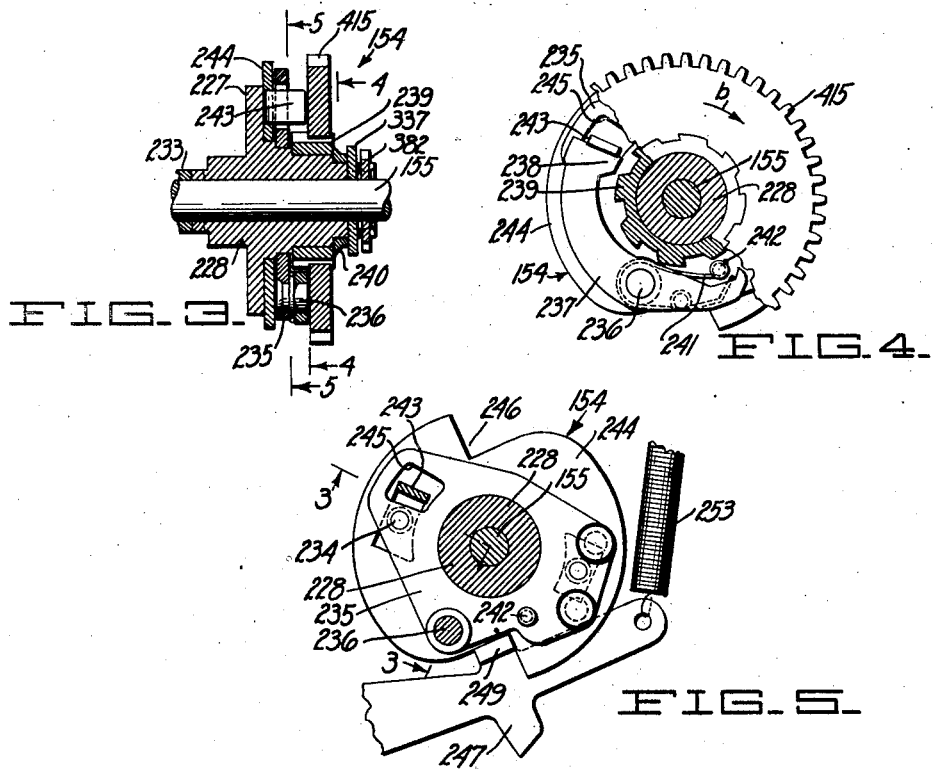
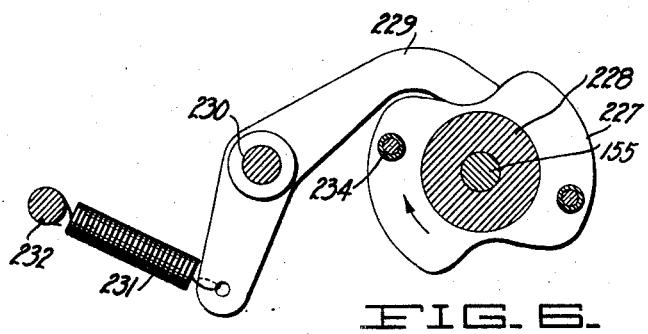
INVENTOR
WALTER E. MATHI
BY
ATTORNEYS May 14, 1946. W. E. MATHI 2,400,244
CALCULATING MACHINE
Filed Aug. 25, 1941 9 Sheets-Sheet 3

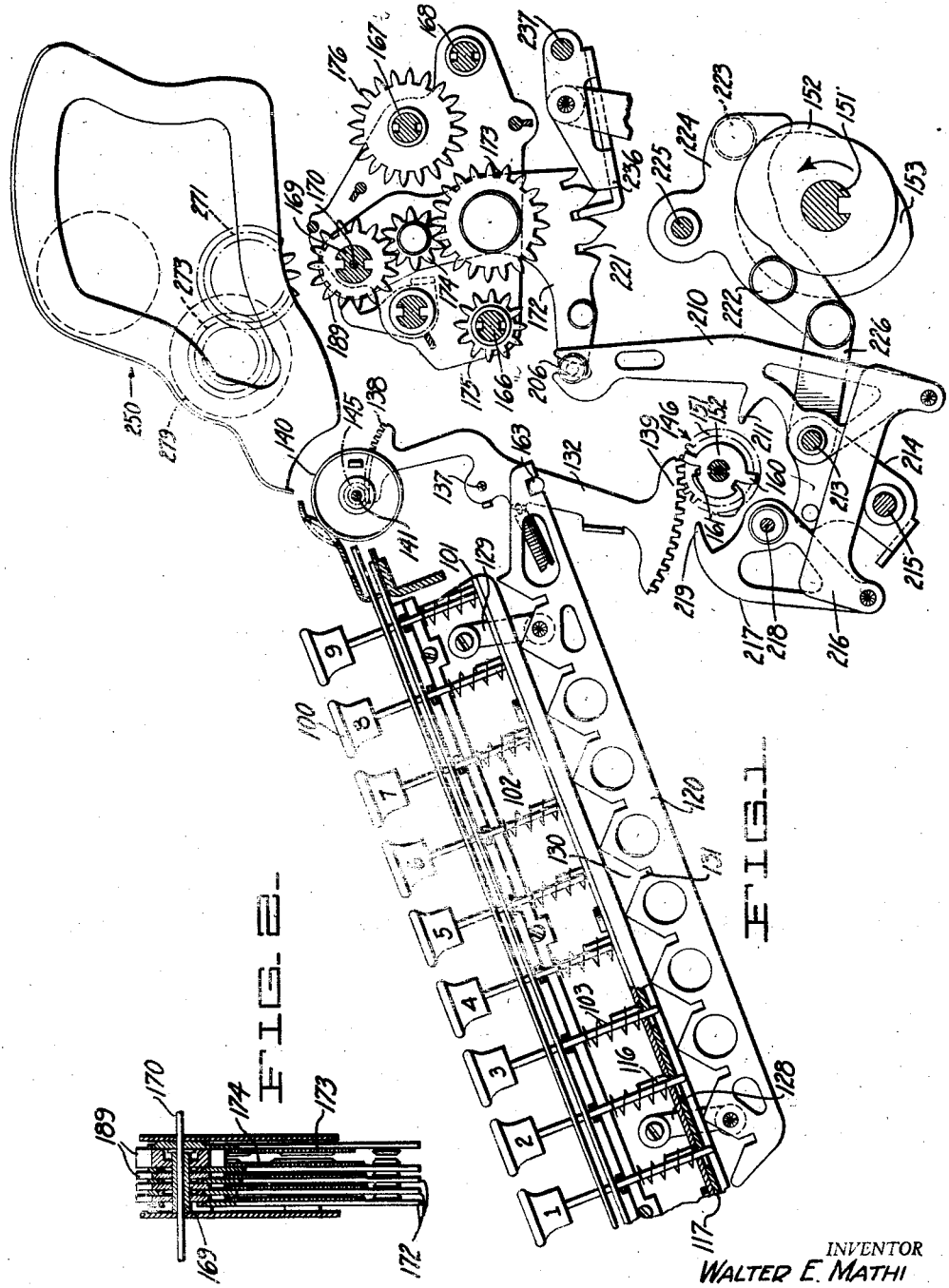

INVENTOR
WALTER E. MATHI

BY
ATTORNEYS

May 14, 1946.　　　W. E. MATHI　　　2,400,244
CALCULATING MACHINE
Filed Aug. 25, 1941　　　9 Sheets-Sheet 4
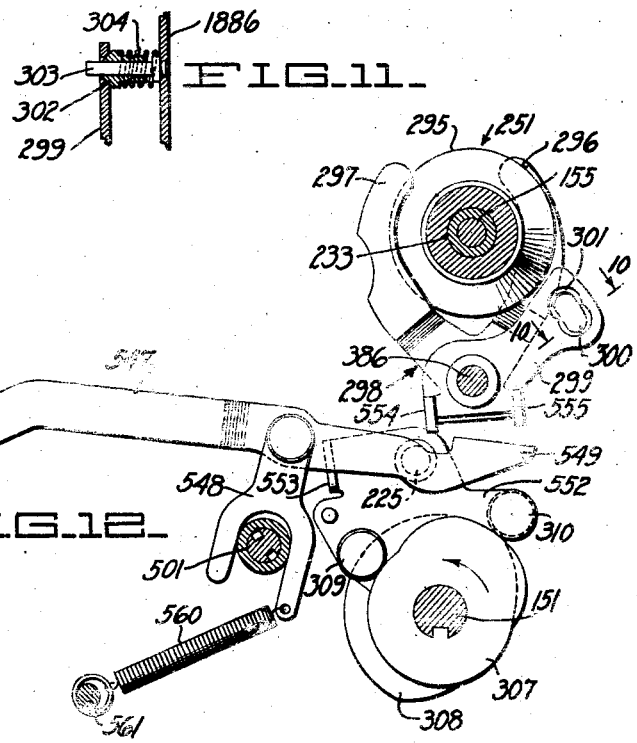
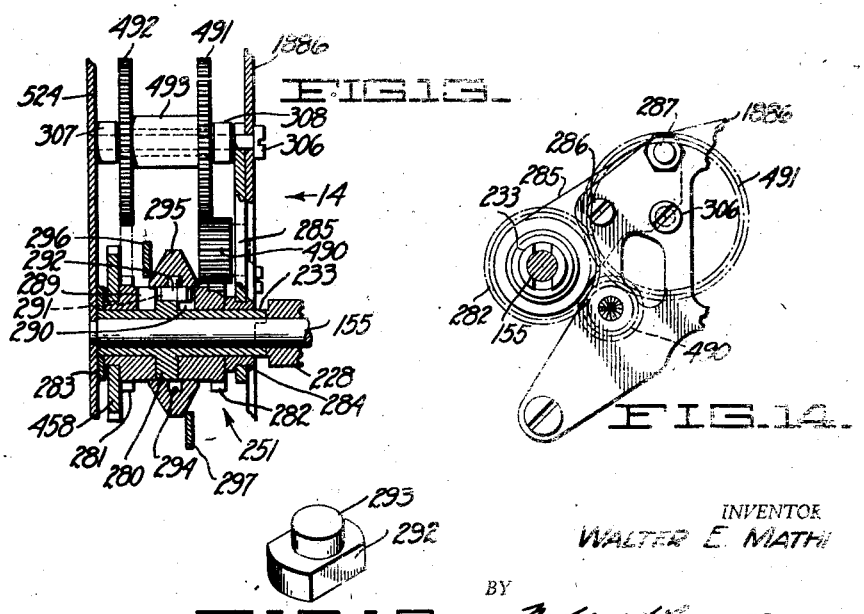
INVENTOR
WALTER E. MATHI
BY
ATTORNEYS May 14, 1946.  W. E. MATHI  2,400,244
CALCULATING MACHINE
Filed Aug. 25, 1941  9 Sheets-Sheet 5
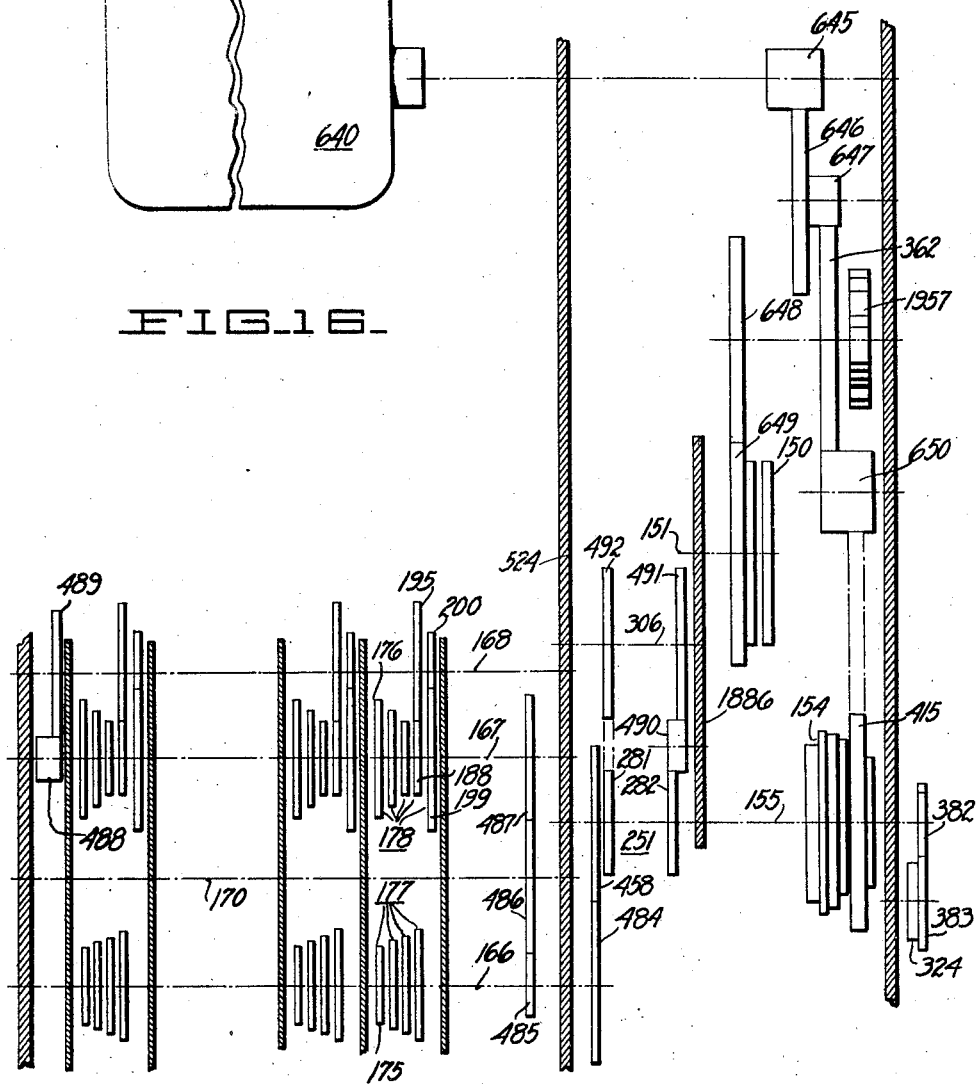
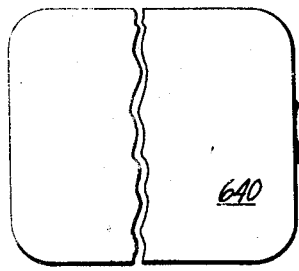
INVENTOR
WALTER E. MATHI
BY
ATTORNEYS May 14, 1946. W. E. MATHI 2,400,244
CALCULATING MACHINE
Filed Aug. 25, 1941 9 Sheets-Sheet 6
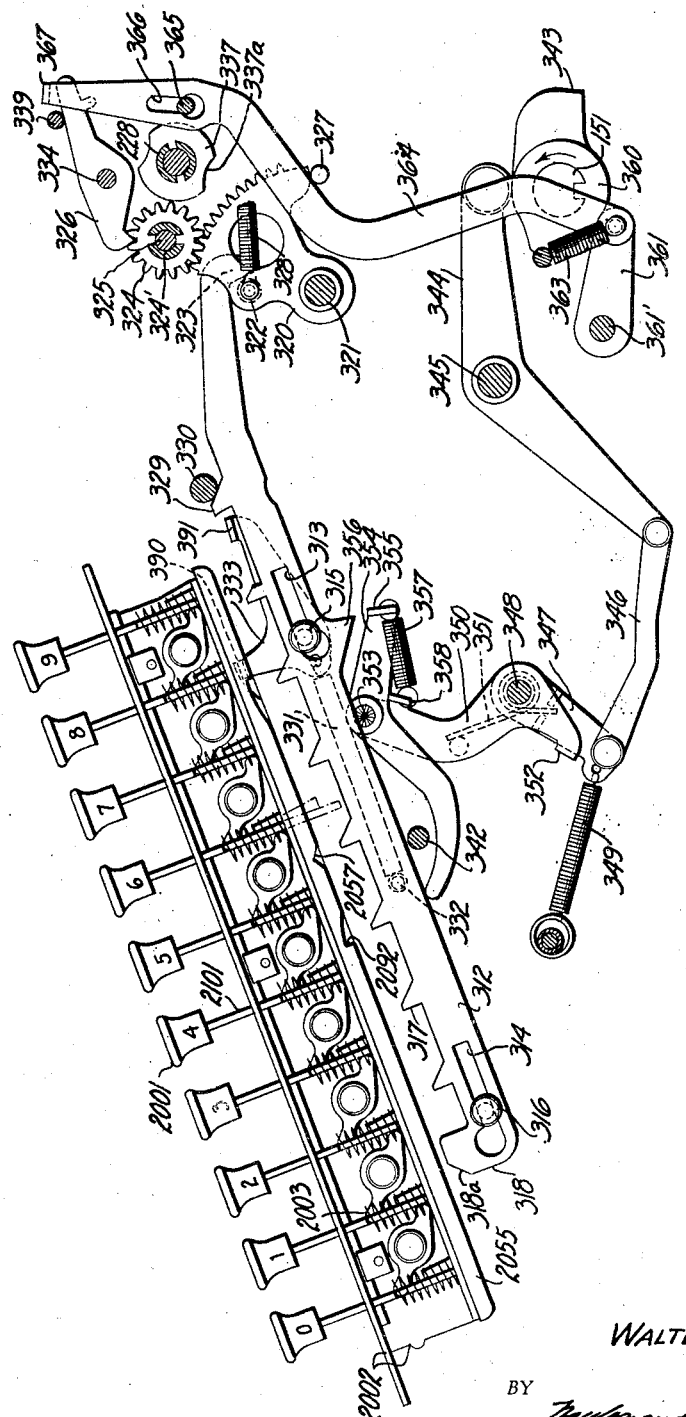
INVENTOR
WALTER E. MATHI
BY
ATTORNEYS

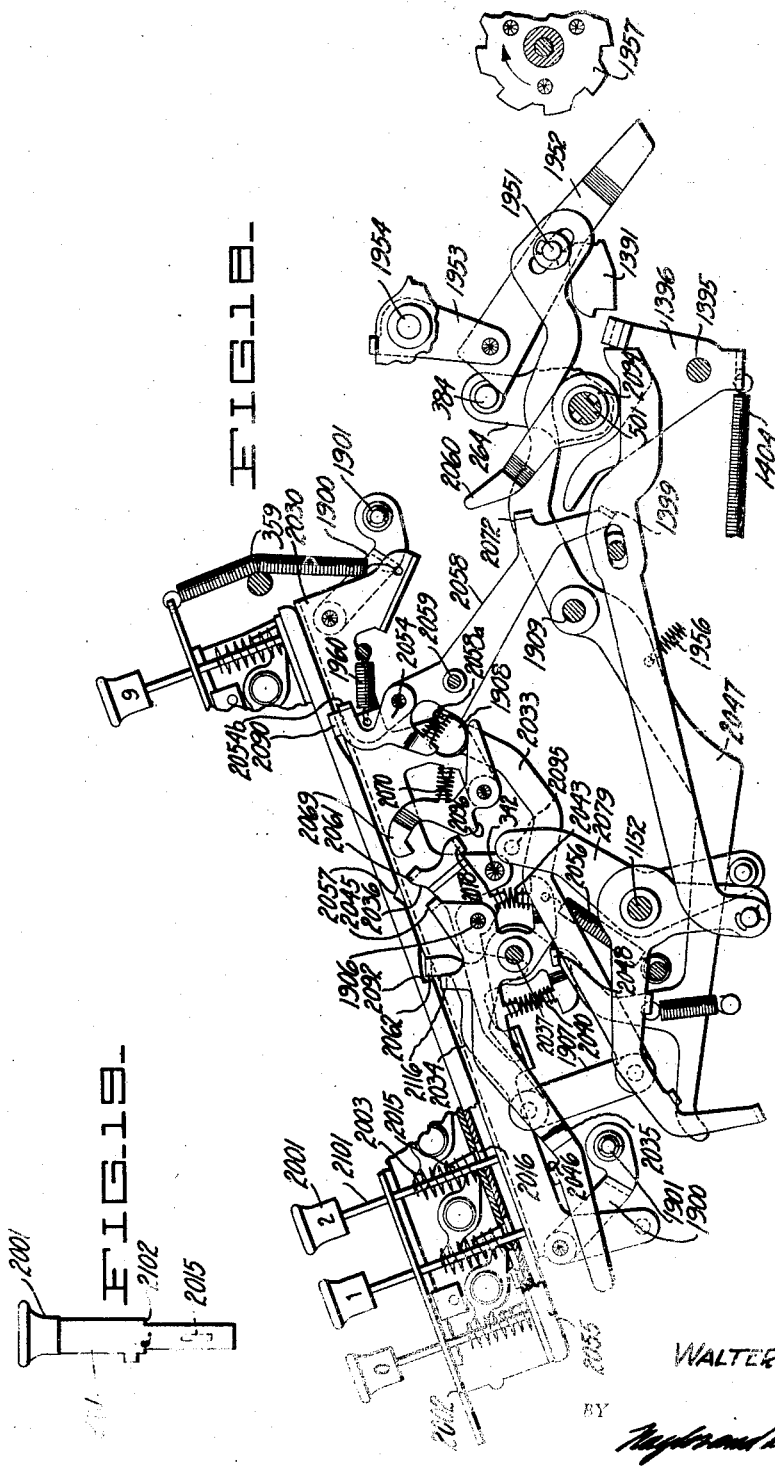

May 14, 1946.                W. E. MATHI                2,400,244
                      CALCULATING MACHINE
              Filed Aug. 25, 1941          9 Sheets-Sheet 8

INVENTOR
WALTER E. MATHI

May 14, 1946.  W. E. MATHI  2,400,244
CALCULATING MACHINE
Filed Aug. 25, 1941  9 Sheets-Sheet 9

INVENTOR
WALTER E. MATHI
BY
ATTORNEY.

Patented May 14, 1946

2,400,244

UNITED STATES PATENT OFFICE 2,400,244

CALCULATING MACHINE

Walter E. Mathi, Oakland, Calif., assignor to Marchant Calculating Machine Company, a corporation of California Application August 25, 1941, Serial No. 408,188

8 Claims. (Cl. 235—62)

This invention relates to calculating machines and has particular reference to a control mechanism for causing a calculating machine to operate through a predetermined number of cycles, as for instance, in performance of multiplication problems.

It is an object of the present invention to provide an improved and simplified type of multiplication control mechanism for calculating machines.

A more specific object is to provide a multiplication control mechanism of this character which is adapted for high speed operation.

A further specific object of the invention is to correlate certain control devices employed in both automatic multiplication and automatic division operations so as to reduce the number of parts and generally to simplify the machine.

The invention is illustrated as being embodied in a high speed type of calculating machine such as is disclosed in the Avery Patent Number 2,216,659, issued October 1, 1940, incorporating improvements disclosed and claimed in the Boyden et al. Patent Number 2,333,234, issued November 2, 1943, to which patents reference may be had for a disclosure of a complete calculating machine including mechanism not specifically described herein.

It is to be understood that, although the invention is disclosed as being applied to a machine of the general type shown in the above mentioned patents, the invention is also applicable to other types of calculating machines, and furthermore, although particularly directed to the control of multiplication operations, certain features of the invention may also be applied to other mechanisms.

The invention possesses a plurality of advantageous features, some of which will be set forth in full in the following description, and while the preferred construction thereof is shown in the accompanying drawings, it is to be understood that the invention is capable of embodiment in modified forms within the scope of the appended claims.

In the accompanying drawings:

Figure 1 is a sectional view in side elevation of the keyboard, the selection mechanism controlled thereby, and a portion of the actuator mechanism.

Figure 2 is a sectional view through one of the selection plate assemblies.

Figure 3 is a longitudinal sectional view through the main clutch and is taken along the line 3—3 of Figure 5.

Figure 4 is a transverse view, partly in section, of the main clutch and is taken substantially along the line 4—4 of Figure 3.

Figure 5 is a transverse sectional view taken along the line 5—5 of Figure 3.

Figure 6 is a sectional view of the centralizer for the actuator unit.

Figure 11 is a sectional view of the detent for holding the reverse clutch control lever in either of its two adjusted positions.

Figure 12 is a side elevational view, partly in section, of the reverse unit and its controlling mechanism.

Figure 13 is a sectional view taken through the reverse unit mechanism.

Figure 14 is a side view taken in the direction of the arrow 14 of Figure 13.

Figure 15 is a perspective view of the reverse dog.

Figure 16 is a schematic view showing various units of the machine insofar as their relationship to the driving means therefor is concerned.

Figure 17 is a sectional view in elevation of the multiplier selection unit.

Figure 18 is a sectional elevational view with parts broken away of part of the multiplier control unit.

Figure 19 is a detail view of one of the multiplier keys.

*Selection mechanism*

Figure 8:
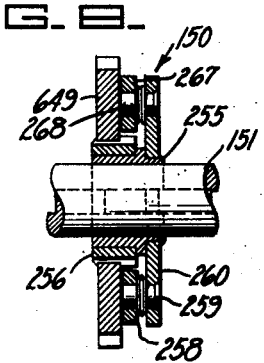
Figure 8 is a longitudinal sectional view of the program clutch and is taken substantially along the line 8—8 of Figure 7.

The machine in connection with which the present invention is illustrated is of the key-set type in which means are provided for first setting one factor of the calculation upon a keyboard and subsequently operating the machine by manipulation of a separate control bar or key in a manner indicated by the sign character and the amount of another factor of the calculation.

The mechanism for setting up the first factor may be considered as comprising a manually operated portion and a power operated portion, the manually operated portion being designed to be moved to a selected controlling position by the depression of value keys on the keyboard, and the power operated portion being designed to be brought into operation immediately before operation of the calculating mechanism and to act under control of the manually set selection mechanism to move elements of the calculating mechanism to the proper position to cause operation thereof to enter the values set up on the keyboard.

The various value selecting keys 100 (Figure 1) of the keyboard are arranged in a series of banks, each bank including progressively arranged keys ranging from 1 to 9 in value, and, as disclosed in detail in the above Avery Patent 2,216,659, each key 100 is slidable vertically in a channel frame 101. Compression springs 102 are provided to normally maintain all of the keys 100 in a raised position.

All of the key stems 103 of the value keys are of the same length and each has a cam extrusion 116 which, upon depression of the associated key, pushes to the right, as viewed in Figure 1, a slotted key locking slide 117 slidably supported on the underside of the channel 101, thereby releasing any other latched down key in the same section. Upon full depression of any value key, the slide 117 is returned to its initial location under spring pressure, and by overlapping the upper end of the extrusion 116 latches the depressed key.

Disposed beneath the value keys 100 in each bank is a differentially settable bar 120 which is pivotally suspended from the associated channel frame 101 by means of two parallel links 128 and 129. This bar 120 has nine identical divergent notches 130 therein, each of which terminates in a rectangular slot 131 proportioned to receive the end of the associated key stem 103 so that the bar 120 will be accurately positioned. The key stems 103 are spaced equal distances apart and these distances are slightly greater than the spacings between successive slots 131 so that each succeeding slot 131 will be spaced one increment further away from the cooperating key stem. Thus, depression of a value key will cam the bar 120 to the right a number of increments equal to the value represented by the depressed key.

Such movement of each of the bars 120 is utilized to set up a mechanical representation of the selected value to control the actuating mechanism accordingly, and for this purpose a segment member 132 is connected by means of a pin and slot connection 163 to each bar 120 and is pivotally mounted on a common shaft 137 extending across the machine and supporting like members associated with other key banks. Each of the segment members 132 is provided at opposite ends thereof with arcuate racks 138 and 139 which serve to transmit the movement of the differential bars 120, respectively, to a pinion 145 of a check dial assembly 140 rotatably mounted on a shaft 141, and through a gear 151 to a cam unit 146 which is positioned by such movement to form a mechanical representation of the value set up on the respective key bank.

Each cam unit 146 comprises a gear 151 and five cams connected thereto, one of which is shown at 152. Each one of the cams has two high points 160 and two low points 161 on its periphery. The cams are so staggered that no high or low point on one cam is aligned with a high or low point on another cam.

As is described in detail in the above mentioned Avery patent, the various cams on the cam unit 146 are so arranged that upon depression of a value key 100, the gear 151 of the same order will be driven by the arcuate rack 139 to rotate the cam unit 146 to a position wherein one of the high points of one only of the cams will be positioned in the path of a nose 211 of one of a set of five feeler arms 210 on one side of the cam unit 146, or in the path of a nose 219 of one of a set of five feeler arms 217 on the opposite side of the unit 146.

Upon depression of one of the calculation control keys, such as one of the multiplier keys 2301 (Figures 17 and 18), a program clutch 150 (Figures 7, 8, and 10) is engaged to rotate one-half revolution, as will be more fully described hereinafter, to likewise rotate a program shaft 151. Keyed on the program shaft 151 are a number of pairs of complementary cams identical to cams 152 and 153 (Figure 1), and each pair has an associated cam follower 224 pivoted on a cross rod 225 and provided with a roller 222 in engagement with the cam 152 and a second roller 223 in engagement with the cam 153. As the shaft 151 rotates in a counter-clockwise direction, the cam followers 224 are rocked in a clockwise direction and, through links 226, impart a counter-clockwise rocking movement to a series of levers 214 pivoted on a shaft 215.

A shaft 213, supported by the levers 214, has pivotally mounted thereon the groups of feeler arms 210 hereinbefore described, one of these groups being located adjacent each of the cam units 146. During the leftward movement of the levers 214 and consequently of the shaft 213, the feeler arms 210 are moved by the shaft 213 until each of the noses 211 thereon engages the periphery of the respective cam in the cam unit 146, thereby causing each feeler arm 210 to pivot about the point of contact between its respective nose and the periphery of its associated cam. The balance of the forward movement of the shaft 213 by the cam followers 224 effects forward movement of the lower ends of the feeler arms 210, and this movement is transmitted through links 216 to feeler arms 217 aligned with the associated feeler arms 210. The arms 217 are then rocked in a clockwise direction about a fixed shaft 218 until their noses 219 engage the peripheries of the respective cams at a point substantially diametrically opposite that engaged by the noses 211 of the associated feeler arms 210.

As was mentioned hereinbefore, each of the cam units 146 is so arranged that only one of the associated pairs of feeler arms 210 and 217 of any group will have their respective noses in engagement with the high or low points of a cam at any one value setting of the respective key section. Thus, one of the feeler arms 210 will be rocked a considerable angle about its supporting shaft 213 to one side or the other of a medial position indicated in Figure 1, depending upon whether its nose 211 is in engagement with a high point 160 or low point 161 of its respective cam. All of the other feeler arms will, since their noses are held in engagement with the concentric peripheral portions of their cams, be held in medial positions.

Each of the feeler arms 210 is connected through a pin and slot connection 206 with one of a series of five plates 172 pivotally suspended from a sleeve 169 (Figures 1 and 2) which is rotatable on a stationary rod 170, there being one such series of plates for each order of the machine. Pivotally mounted on each plate 172 is a set of entrained gears 173 and 174, the latter meshing with a laminated gear 189 keyed to the sleeve 169.

Actuating mechanism

From the above it will be seen that, depending on the selection made, four of each group of five of the selection plates 172 will be held in medial positions similar to that indicated in Figure 1, while the fifth will be moved forward or rearward until the lowermost gear 173 thereon meshes with an aligned gear indicated at 175 on an actuator shaft 166, or with an aligned gear indicated at 176 on an actuator shaft 167 (see also Figure 16).

Gear 175 is one of a group 177 of four gears keyed on the shaft 166 and adapted to mesh with the lowermost gears 173 on the four leftmost selection plates 172 in each order. Likewise, gear 176 forms one of a group 178 of five gears mounted on the shaft 167 and adapted to enmesh with the gears 173 on the five selection plates of the associated series of plates. The three leftmost gears of this latter group are keyed to the shaft 167 while the two rightmost gears 188 and 199 are free on the shaft 167 and mesh with gears 195 and 200, respectively, keyed on a third actuator shaft 168.

The shafts 166, 167 and 168 are connected to a cyclically operable main clutch 154 (Figures 3, 4, 5, and 16) in a manner to be described presently, so that the shaft 166 rotates through a 180° for each cycle (one-half revolution) of operation of the clutch 154, and the shaft 167 rotates through 90° for each cycle, while shaft 168 moves through 30° for each cycle of the main clutch. The diameters of the various gears in the two gear groups 177 and 178, are so arranged that for each main clutch cycle, the gear 189 (Figures 1 and 2) will be rotated through one of the gears of the groups 177 and 178, a number of increments corresponding to the value of the associated key 100 which is depressed. If no key has been depressed, the selection plates 172 will be so arranged that none of the gears in either of the groups 177 and 178 will become operative to drive the selection plate gears 173.

Means are provided for locking the selection plates 172 in any of their three operative positions throughout a machine operation and comprises a lock bail 236 pivotally supported on a rod 237 and moved into engagement with one of three notches 221, formed on each of the selection plates 172, after a selection has been made. This is accomplished by mechanism described in detail in the above mentioned Boyden et al. Patent Number 2,333,234, issued November 2, 1943.

As disclosed in detail in the aforementioned Avery Patent 2,216,659 the accumulator is carried by a carriage 250 transversely shiftable relative to the machine proper, and comprises a pair of entrained gears 271 and 273 in each accumulator order, the latter gear being connected through suitable planetary mechanism with an associated accumulator dial indicated by the dotted lines 279 which is visible through the cover of the machine. At the start of a calculation, the gears 271 and 273 are dipped under control of the program clutch 150 to cause the gears 271 to mesh with the aligned laminated gears 189 and thereby transmit entry of a selected value from the gears 189 into the accumulator.

General calculations drive

Power for effecting operation of the various mechanisms of the machine, including the program clutch 150 and main clutch 154, is derived from a motor 640 (Figure 16), the armature shaft of which is connected to a pinion 645 entrained with a gear train including gears 646, 647, 362, 650, and 415, the latter gear being mounted on the driven side of the main clutch 154. When the main clutch is engaged, power is transmitted thereby through a reverse unit, generally indicated at 251 (to be described in detail hereafter) to the above mentioned actuator shafts 166 and 167 through a gear train including gears 458, 484, 485, 486, and 487. The shaft 168 is driven by the shaft 167 through gears 488 and 489.

The program clutch 150 has a gear 649 mounted on the driven side thereof which meshes with a gear 648 coupled to the motor driven gear 362.

Main clutch

The main clutch 154 (Figures 3, 4, and 5) for driving the various actuating shafts 166, 167, and 168 (Figures 1 and 16) is of the cyclically operable ratchet type in which one cycle operation is completed in one-half revolution.

The main clutch has incorporated therewith a centralizer cam 227 (Figures 3 and 6) having a hub 228 rotatable on a fixed shaft 155. A follower 229, pivoted at 230, is pressed against the periphery of the centralizer cam 227 by a spring 231 tensioned between the follower and a frame stud 232. The hub 228 is coupled with a reverse unit drive sleeve 233 (Figures 3 and 13) so as to drive the reverse unit when the clutch is engaged.

Secured to the cam 227 by rivets 234 is a pawl supporting plate 235 having secured thereon a bearing stud 236 forming a bearing for a pawl 237. The pawl is provided with a tooth 238 adapted to engage the teeth of a ratchet 239 journaled on the hub 228 and retained thereon by a ring 240. The hereinbefore mentioned motor driven gear 415 is rigidly splined on the ratchet to drive the same in a clockwise direction as indicated by the arrow $b$ in Figure 4.

The pawl 237 is urged clockwise toward engagement with the ratchet 239 by a torsion spring 241 extending between the tail of the pawl and a stud 242 fixed on the plate 235. However, when the clutch is disengaged the pawl 237 is held from engagement with the ratchet by means of an ear 243 on a floating pawl release disc 244 rotatable on the hub 228 and extending between the spaced but integrally connected cam 227 and disc 235. Ear 243 extends through an enlarged opening 245 in the plate 235.

The disc 244 is provided with two diametrically opposed notches 246 either of which is adapted to be engaged by an ear 249 of a clutch control dog 247 (Figures 5 and 10) pivoted on a fixed stud 248 and urged counter-clockwise by a spring 253 tensioned between the dog and a frame stud (not shown).

When the dog 247 is rocked clockwise against the action of spring 253 in a manner to be described hereafter, the disc 244 will be freed of restraint of ear 249 and will allow the torsion spring 241 to cause the pawl 237 to rotate the disc 244 clockwise a slight amount relative to the hub 228, enabling the tooth 238 to engage the rotating ratchet 239 and effect a drive from the gear 415 to the centralizer hub 228.

When the clutch control dog 247 is allowed to be pulled counter-clockwise by the spring 253 during operation of the main clutch, the ear 249 rides on the outer periphery of the disc 244, and as the shoulder on the next notch of the disc 244 strikes the ear, the disc is arrested. However, the actuating mechanism, due both to momentum and to the action of the centralizer cam follower 229 drives the centralizer cam and hub 228 forward a small amount to the position illustrated in Figure 6. During this slight advancement of the pawl 237 against the now stationary ear 243 the pawl is forced to rock counter-clockwise about its bearing stud 236 to disengage the pawl tooth 238 from the ratchet 239. Thereafter, the centralizer cam 227 and follower 229 cooperate to prevent the torsion spring 241 from backing the centralizer hub 228 and pawl supporting plate 235 enough to reengage the pawl.

Main clutch control

Means are provided under control of the program clutch for causing engagement of the main clutch upon depression of a calculation control key, and after the various actuating gears 177 and 178 (Figure 16) have been enmeshed with the transmission gears on the selection plates 172 (Figures 1 and 2).

Figure 10:
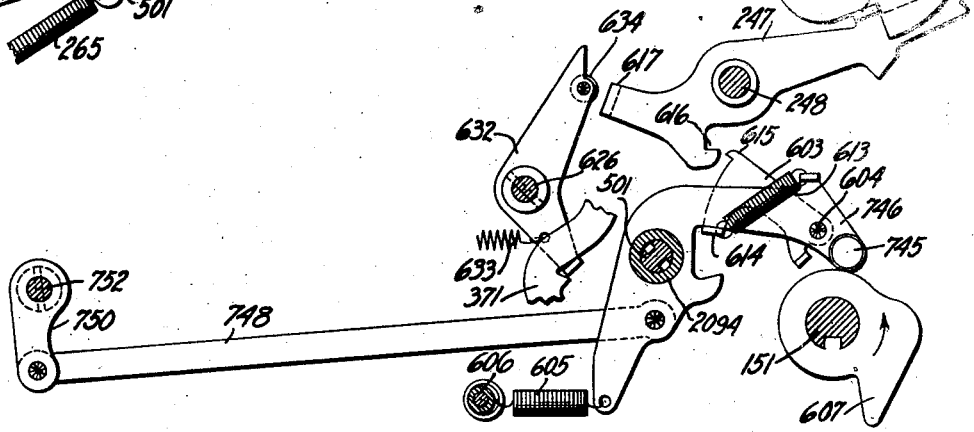
Figure 10 is a side elevational view of part of the mechanism for controlling operation of the main clutch.

As shown in Figure 10, a lever 746 pivoted on a shaft 501 has a roller 745 mounted thereon which is held against a cam 607 on the shaft 151 by a spring 605 tensioned between the lever 746 and a frame stud 606. The lever 746 carries a member 603 pivoted thereon at 604 and normally maintained in its illustrated position, with an ear 614 thereon held against the under surface of the lever 746, by a spring 613 tensioned between the ear 614 and an ear on the lever 746.

During rotation of the shaft 151 the cam 607 rocks the lever 746 counter-clockwise causing a nose 615 on the member 603 to engage in a notch 616 formed in the clutch control dog 247 and thus rocks the dog away from the main clutch 154 to cause engagement of the same. This occurs toward the end of the setting phase of the program clutch cycle which is one-half revolution of the shaft 151. As the shaft 151 moves further near the end of this phase of the clutch cycle, the lever 746 is allowed to drop to a low point on the cam 607 permitting the dog 247 to stop the clutch 154 when it is otherwise allowed to do so as will appear hereinafter.

In view of the fact that the clutch control dog 247 is not freed from the lever 746 until after the main clutch has commenced operation, at least a single main clutch cycle will always ensue upon operation of the program clutch except under certain conditions in division calculations which need not be considered herein. Means are provided, however, whereby the main clutch may be maintained engaged throughout a multicycle operation, as is necessary during a multiplication performance involving a multiplier factor digit of a value greater than one.

A latch 632 fixed on a rockable shaft 626 has a latching roller 634 mounted on the upper end thereof which is adapted, under certain conditions described hereinafter in connection with the multiplier control mechanism, to be moved under an ear 617 of the main clutch control dog 247 to hold the dog rocked in a clockwise direction out of contact with the main clutch for any desired number of main clutch cycles. A spring 633 tensioned between the latch 632 and a portion of the machine frame urges the latch 632 clockwise toward latching engagement with the dog 247.

Program clutch

The machine in which the present invention is embodied employs a program clutch and mechanism driven thereby to perform various operations incident to the commencement of a calculation under power of the motor, this mechanism being of the general type described in detail in the aforesaid Boyden et al. patent.

Figure 7:
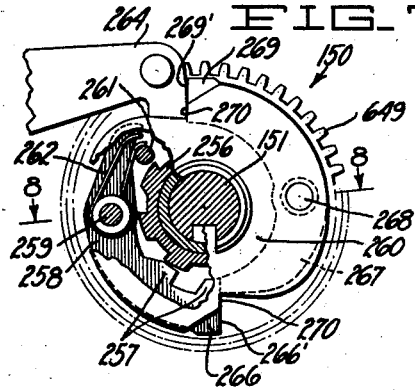
Figure 7 is a transverse view, partly in section, of the program clutch.

Referring to Figures 7 and 8 in particular, the program clutch 159 comprises a sleeve 255 keyed on the shaft 151, on which is journaled a ratchet 256 having rigidly splined thereon a motor driven gear 649. The ratchet 256 is adapted to be engaged by a pair of teeth 257 on a pawl 258 journaled on a bearing stud 259 fixed on a pawl supporting disc 260 which is fitted over the sleeve 255 and keyed to the shaft 151. A torsion spring 262 extends between a stud 261 fixed on the disc 260 and the tail of the pawl 258, and tends to move the teeth 257 into pawling engagement with the ratchet to transmit drive from the gear 649 to the shaft 151.

In engagement with the head 266 of pawl 258 is a pawl release lever 267 pivoted on a stud 268 also mounted on the disc 260. It will be noted that the bearing stud 268 is diametrically opposite the stud 259 and that the head 269 of the lever 267 is diametrically opposite the head 266 of pawl 258.

Figure 23:
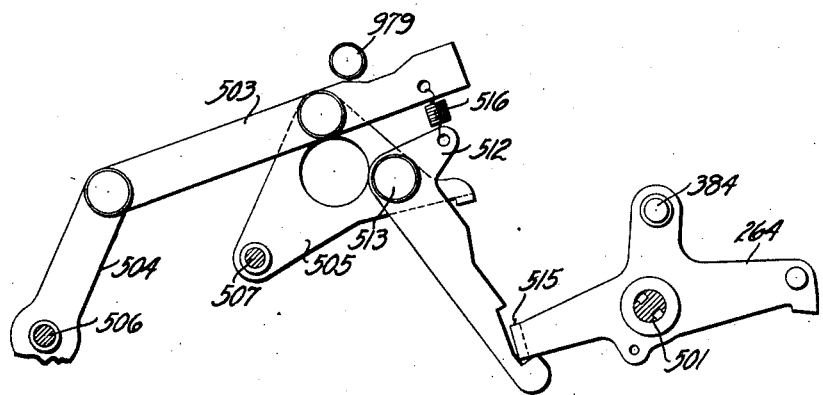
Figure 23 is a vertical sectional view illustrating controls for initiating operation of the program clutch.

The pawl 258 is held from engagement with the ratchet 256, or is allowed to engage the same, by means of a program clutch control dog 264 (Figures 7, 9, and 23), pivoted on the shaft 501 and urged clockwise toward engagement with the pawl supporting disc 260 by a spring 265 tensioned between the dog and the machine framework. The disc 260 has two diametrically opposed notches therein, each forming a shoulder 270 adapted to strike the nose of the dog 264 to arrest rotation of the disc and shaft 151.

When the program clutch control dog 264 is rocked counter-clockwise in a manner to be described hereinafter under the section "Automatic multiplier unit" to institute a machine operation, and is moved sufficiently to clear either head 266 of the pawl 258 or head 269 of the release lever 267, respectively, with which it is in contact, the spring 262 will rock the pawl 258 into engagement with the ratchet to initiate power operation of the shaft 151. Such rocking movement of pawl 258 will carry the front edge 266' of the pawl 258 a small amount to the right (as viewed in Figure 7) of the corresponding shoulder 270 on the disc 260. This movement will also be transmitted to the release lever 267 extending its front edge 269' to the left of its associated shoulder 270.

Now, when the clutch dog 264 is allowed to drop onto the periphery of the disc 260 under the pull of its spring 265, it will follow the contour of the disc and thus block one or the other of the heads 266 and 269, depending upon which head first moves into engagement therewith, and will consequently rock the pawl 258 out of engagement with the ratchet 256 either directly or through the intermediary of the release lever 267. As the momentum of the shaft 151 carries it further, the corresponding shoulder 270 of the disc 260 strikes the nose of the clutch dog 264, arresting rotation of the shaft. A suitable centralizing cam (not shown) such as is disclosed in Figure 42 of the above mentioned Avery Patent 2,216,659 is provided to prevent any tendency of the shaft 151 to rebound.

Actuator reverse unit

A reverse unit 251 (Figures 12, 13, and 16) is provided in the drive train between the main clutch and the actuating shafts 166, 167, and 168 to reverse the direction of actuation and thereby to make possible either positive or negative multiplication, as well as addition, subtraction and division operations.

The unit 251 comprises a drive sleeve 233 rotatable on the fixed shaft 155 and keyed to the hereinbefore mentioned driven hub 228 (Figures 3 and 13) of the main clutch. Journaled on the sleeve 233 on either side of a central flange 280 thereon are a pair of independently rotatable gears 281 and 282, the former having rigidly secured thereon the hereinbefore mentioned gear 458 included in the drive train of the actuator shafts 166, 167, and 168. The gear 281 is retained in proper position on the sleeve 233 by a washer 283 situated between the gear and a frame plate 524, while the gear 282 is retained in proper position by a sleeve 284 fixed to a plate 285 (Figures 13 and 14) which, in turn, is fixed by screws 286 and 287 to a second frame plate 1886.

Gears 281 and 282 have slots 289 and 290, respectively, therein adapted to be aligned with each other and with a slot 291 in the central flange 280 of the sleeve 233 when the main clutch is in full cycle position as illustrated. Slidably positioned in the slot 291 is a coupling member or dog 292 (Figures 13 and 15) adapted to be engaged in either the notch 290 of gear 282 or in the notch 289 of gear 281 for the purpose of coupling the drive sleeve 233 with either gear. The member 292 has a short shank 293 fitted in an annular groove 294 of an annular collar 295 journaled on the periphery of the hub portions of gears 281 and 282, as well as on the periphery of the flange 280. The collar 295 has inclined sides, as illustrated in Figure 13, adapted to be engaged by a pair of spaced arms 296 and 297, respectively, of a reverse control member 298 pivoted on a shaft 386 (Figure 12).

The control member 298 is adapted to be yieldably held in either of two rocked positions by a detent device (Figures 11 and 12) comprising an arm 299 fixed to the member 298 and provided with an arcuate slot 300 merging into two spaced counter-sunk portions 301 at either end of the slot 300, into one or the other of which is adapted to be pressed a conical faced plunger 302 slidable along a stud 303 fixed to the frame plate 1886. A compression spring 304 forces the plunger 302 against the arm 299 and into either of the counter-sunk portions 301 depending on the rocked position of the member 298.

When the control member 298 is rocked into the position illustrated in Figure 12 termed the "positive" position, the arm 296 engages the adjacent inclined side of the collar 295 and shifts the collar to the right, as viewed in Figure 13, coupling the sleeve 233 to the gear 282 whereupon rotation will be transmitted through sleeve 233 and gear 282 to a pinion 490 and thence to a double idler arrangement comprising spaced gears 491 and 492 rigidly coupled to the opposite ends of a sleeve 493. The gear 492 meshes with the gear 281 and thereby transmits rotation through gear 281 to the gear 458 (see also Figure 16) in such a direction as to cause a positive actuation.

When the control member 298 is rocked to a position clockwise of that illustrated in Figure 12, the arm 297 thereof cams the collar 295 to the left, as viewed in Figure 13, causing the member 292 to couple the sleeve 233 directly to the gear 281 and thus cause a negative actuation.

Means are provided to facilitate proper timing of the gears 281 and 282 so that the slots 289, 290, and 291 will be properly aligned with each other in full cycle position of the machine. To accomplish this the sleeve 493 for the gears 491 and 492 is journaled on a bolt 306 and extends between a pair of washers 307 and 308, the latter extending between the heretofore mentioned plate 285 and the right hand end of the sleeve 493. When, as in assembling the various parts, it is desired to correctly time the various gears of the reverse unit, the screws 286 and 287 (Figure 14) are removed and the plate 285 is swung upwardly, allowing the washer 308 and sleeve 493 to be shifted rightwardly until the gear 492 is disengaged from the gear 281 at which time the proper timing may be effected and the parts then returned and secured in their proper positions.

Control of reverse unit

Figure 21:
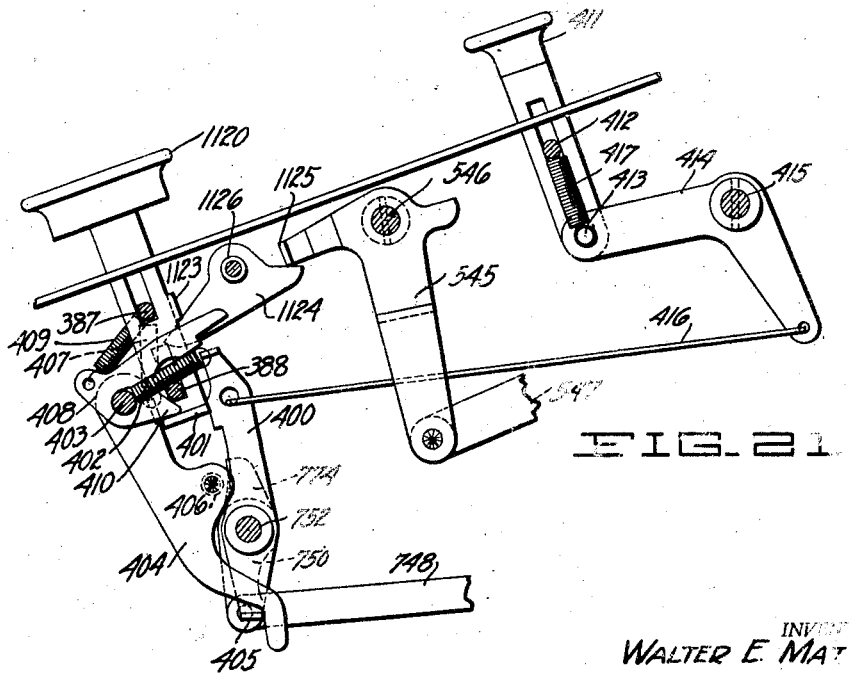
Figure 21 is a vertical sectional view illustrating the short-cut key and the stop key for releasing the same.

Means are provided under the control of certain of the machine control keys, such as the "Short-cut" key 1120 (Figure 21) to condition the reverse unit 251 for reverse operation.

A pendular lever 545 (Figures 12 and 21) is fixed to a rockable shaft 546 and is pivotally connected at the lower end thereof to a link 547 to which is also pivoted a link member 548 having a bifurcated end embracing a sleeve on the shaft 501. A spring 560, tensioned between one leg of link 548 and a frame stud 561, normally holds the link 547 in an extreme rightward or "positive" position illustrated in Figure 12, wherein the upper surface of an upturned end 549 of the link 547 underlies a lug 555 on the reverse unit control member 298.

When the lever 545 is rocked clockwise by certain of the machine controls, as set forth above, the link 547 is moved to the left against the action of spring 560 to move the upturned end 549 from under the lug 555 to a new position under a second lug 554 on the control member 298.

The link 547 is rocked upwardly to set the reverse unit control member 298 in either of its two positions by complementary cams 307 and 308 on the shaft 151. Cams 307 and 308 are engaged by rollers 309 and 310, respectively, on a cam follower plate 552 pivoted on the shaft 225, the plate having a lug 553 thereon underlying the link 547. Therefore, during the first half rotation or setting phase of the program clutch and its shaft, the link 547 will be rocked upwardly to engage its upturned end 549 with either of the lugs 554 and 555, depending on the pre-set position of the link 547, to rock the control member 298 to a new position if it is not already in that position.

Automatic multiplier unit

In accordance with the present invention a multiplier control unit is provided which, under control of a bank of multiplier keys, effects a multicyclic operation of the machine to multiply a multiplicand set up on the keyboard of the machine by a multiplier factor set by depressing the multiplier keys. The arrangement is such that simultaneous value selection and actuation of the machine is effected upon depression of the first multiplier key during a multiplication operation.

However, in case the operator is capable of working faster than the machine by depressing a second multiplier key before the machine has finished operation under control of the previously depressed key, the multiplier unit will retain a second multiplier factor entered by the second depressed key and will automatically effect machine operation in accordance with this second value as soon as operation thereof in accordance with the first multiplier value has been completed. Mechanism (not shown) may also be provided to denominationally shift the carriage one step at the end of each multiplication and for a disclosure of such mechanism reference may be had to the above noted Avery Patent 2,216,659.

Referring in particular to Figures 17 and 18, the multiplier keys 2001, ranging progressively from "0" to "9," have their key stems 2101 slidably mounted in a channel frame 2002 and are normally held in their illustrated raised positions by individual springs 2003 extending between the lower flange of the channel frame 2002 and shoulders 2102 (Figure 19) formed on the key stems 2101. Although ten multiplier keys are employed in the multiplier key section, the zero key has no control over the multiplier unit as far as the present invention is concerned, but merely causes a one-step denominational shift of the carriage in a correct direction. Since such mechanism controlled by the zero key has no bearing on the present invention and since the above Avery Patent 2,216,659 discloses the same, it is not illustrated herein.

Also, the number "1" key normally effects operation of the program clutch which, as described hereinbefore, initiates a single cycle of operation of the actuating mechanism, which is the equivalent of multiplying by the value "1." The other multiplier keys from "2" to "9," besides normally initiating operation of the program clutch to incidentally initiate operation of the main clutch, control a selection mechanism which determines the corresponding number of cycles of operation of the main clutch and consequently of the actuating mechanism.

Arranged under the multiplier keys 2 to 9 is a selection bar 312 (Figure 17) having elongated slots 313 and 314 therein guided by frame studs 315 and 316. A series of stop lugs 317 are formed on the upper edge of the bar 312 and each is adapted to engage an associated depressed key stem 2101 and thereby limit forward movement of the bar 312.

The front or perpendicular faces of the lugs 317 are spaced an equal distance apart. This spacing, however, is slightly greater than the distance between successive ones of the equally spaced multiplier key stems so that each lug will be spaced one increment further away from its cooperating key stem. Therefore, when a multiplier key other than "0" and "1" is depressed and the bar 312 is moved to the left, as viewed in Figure 17, in a manner to be described presently, the bar will be allowed to move a number of increments equal to the value of the depressed key. No stop lug is provided for the number "9" key, movement of the bar 312 upon depression of that key being limited by the rightmost edge of the slot 313 upon striking its guide stud 315. Movement of the bar 312 is prevented upon depression of the number "1" key in view of the fact that the leftmost edge 318 of the bar is directly in line with the number "1" key stem when the bar is in its retracted position. The leftmost edge 318 merges with an inclined surface 318a provided to enable the number "1" key stem to cam the bar 312 back to its illustrated position in the event it is not already there when the number "1" key is depressed.

Included in the multiplier selection mechanism is a sector gear 320, pivoted on a shaft 321, and having a pin 322 thereon extending in front of a hook 323 formed on the end of the selection bar 312. The sector gear 320 meshes with a selection gear 324 journaled on a frame stud 325.

The sector gear 320 is normally held in its illustrated position against a stop 327 (Figure 20) by a spring 328 tensioned between the pin 322 and the machine frame, while the bar 312 is normally held in its rightmost illustrated position, with a lug 329 thereon engaging a shaft 330, by a spring 331 tensioned between a pin 332 on the bar 312 and the leftmost end of a latch 333 pivoted on the frame stud 315, the purpose of which will be described hereinafter.

A pawl 326 is provided to hold the selection gear 324 in any set position, except during operation of the program clutch and during certain cyclic periods in multiplication. The pawl 326 is pivoted on a shaft 334, on which is also pivoted a lever 335 (Figure 20) having a roller 336 thereon engaging a cam disc 337 keyed to the main clutch hub 228 (see also Figure 3). The lever 335 is urged clockwise to hold the roller 336 on the disc 337 by a spring 338 extending between a frame stud and the lever. When the main clutch is in full cycle position, the high concentric portion of disc 337 is disposed under the roller 336 and, when in this position, a heavy compression spring 340 extending between the lever 335 and the tail of pawl 326 holds the pawl in engagement with the teeth of the gear 324. A pin 339 on the lever 334 overlies the tail of pawl 326 to limit the counter-clockwise movement of pawl 326 relative to the lever 335 due to the action of the spring 340.

Means responsive to depression of the multiplier keys "1" to "9" and a consequent operation of the program clutch, are provided to yieldably move the selection bar 312 to the left, as viewed in Figure 17, and thereby cause rotation of the selection gear 324 a number of increments equal to the value of a depressed key. Secured on the shaft 151 is a cam 343 engaged by a cam follower 344 pivoted at 345 and connected by a link 346 to an arm 347 of a yieldable lever assembly. The arm 347 is pivoted on a shaft 348 and is urged clockwise into its illustrated position by a spring 349 tensioned between the arm 347 and a frame stud. Also pivoted on the shaft 348 is a second arm 350 of the lever assembly, it being yieldably connected to the arm 347 by a torsion spring 351 wrapped around the shaft 348. A lug 352 of the arm 350 overlies the arm 347 below the shaft 348 so as to enable the spring 349 to exert a direct pull on both of the arms 347 and 350 while providing a yieldable connection when the arm 347 is drawn counter-clockwise by the cam 343.

Pivoted at 353 on the arm 350 is a floating lever 354 having an ear 355 normally lying just to the rear of a shoulder 356 on the bar 312 when the program clutch is in full cycle position. Whenever all of the multiplier keys from one to nine are in a raised position, a spring 357 tensioned between the ear 355 and an ear 358 on the arm 350 holds the lever 354 rocked against the ear 358 so that the ear 355 lies below the shoulder 356. Therefore, operation of the setting clutch under control of any control key other than a multiplier key will merely cause the cam 343 to rock the yieldable lever assembly 347 and 350 and the lever 354 without actuating the bar 312.

However, upon full depression of a multiplier key, a bar 2030 (Figure 18) supported by parallel links 1900, pivoted on the frame at 1901, will be depressed by the corresponding key stem 2101 against the action of a spring 359 tensioned between the bar 2030 and the upper part of the channel frame 2002, and the program clutch will be engaged as will be described hereinafter. Upon such depression of the bar 2030 a stud 342 (Figures 17 and 18) carried by an extension of the bar 2030 and overlying the lever 354, will rock the lever 354 against the action of spring 357 to position the ear 355 directly behind the shoulder 356 on bar 312 so that upon subsequent rocking movement imparted to the yieldable lever assembly by the cam 343, the lever 354 will engage the bar 312 and move the same to the left until it is arrested by the depressed key stem. Continued movement of the arm 347 beyond this point will merely cause the spring 351 to yield. It should be noted at this point that the spring 351 has considerably greater stiffness than the combined stiffness of the two springs 328 and 331 so that the latter cannot exert any appreciable influence over the spring 351.

Means are provided which are operated concurrently with movement of the selection bar 312 for releasing the pawl 326 from gear 324 so as to allow the selection gear 324 to be adjusted to its selected rotative position by the selection bar and sector 320, after which the pawl is reengaged. Keyed on the shaft 151 is a pawl release cam 360 engaged by cam follower 361 pivoted at 361' and urged into engagement with the cam 360 by a spring 363 tensioned between a frame stud and the follower. A link 364 is pivotally connected at the lower end thereof to the cam follower 361 and has an elongated slot 366 therein guided over a frame stud 365. An ear 367 on the link overlies the tail of the pawl 326 and acts under the influence of cam 360 to rock the pawl 326 against the action of the heavy spring 340 (Figure 20) and out of engagement with the teeth of the selection gear 324, just as the gear 324 is beginning to be moved by the bar 312. The cam 360 is so constructed as to release the link 364 from the pawl 326 slightly before the cam 343 allows the spring 349 to retract the yieldable lever assembly including the lever 354, and therefore the gear 324 will be held by the pawl 326 a number of increments away from its illustrated home position equal to the value of the depressed key. The gears 320 and 324 have been so designed that the above mentioned increments of movement imparted to the gears 320 and 324 by bar 312 are equal to the spacing of the teeth on these gears to insure correct pawling of the gear 324.

As the sector gear 320 is moved out of its home position to a selected position by the bar 312, the hereinbefore described main clutch dog latch 632 (Figures 10 and 20) is freed to latch the main clutch dog 247 and make possible a multicyclic operation of the main clutch. During each cycle of operation of the main clutch the sector gear 320 is stepped one increment back toward its home position, and upon complete restoration thereto it causes the latch 632 to release the main clutch dog and effect disengagement of the main clutch. The mechanism for accomplishing this operation will now be described.

Figure 22:
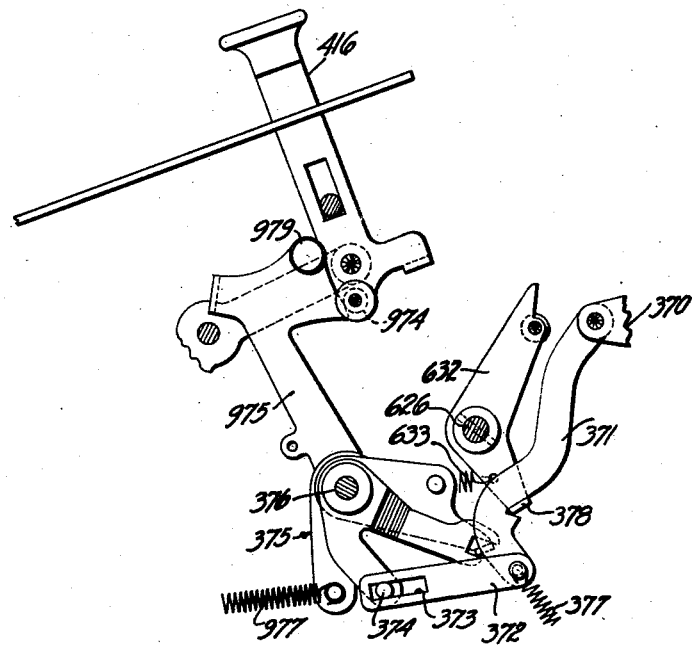
Figure 22 is a vertical sectional view illustrating part of the division control mechanism insofar as its connection with the main clutch tripping mechanism is concerned.

Pivoted on the shaft 321 in juxtaposition with the sector gear 320 is a lever 370 (Figure 20) pivotally connected to a link 371 which, in turn, is pivoted at the lower end thereof to a second link 372, provided with an elongated slot 373 embracing a stud 374. As shown in Figure 22, the stud 374 is mounted on the lower end of the division control lever assembly 375 described in detail hereinafter. The control lever assembly 375 is adapted to be rocked about a shaft 376 during division operation, and in doing so rocks the stud 374 back and forth, however, during multiplication, the stud is held stationary in its illustrated position. A tension spring 377 extending between the link 372 and the frame normally holds the link 371 against an ear 378 on the main clutch dog latch 632.

Figure 20:
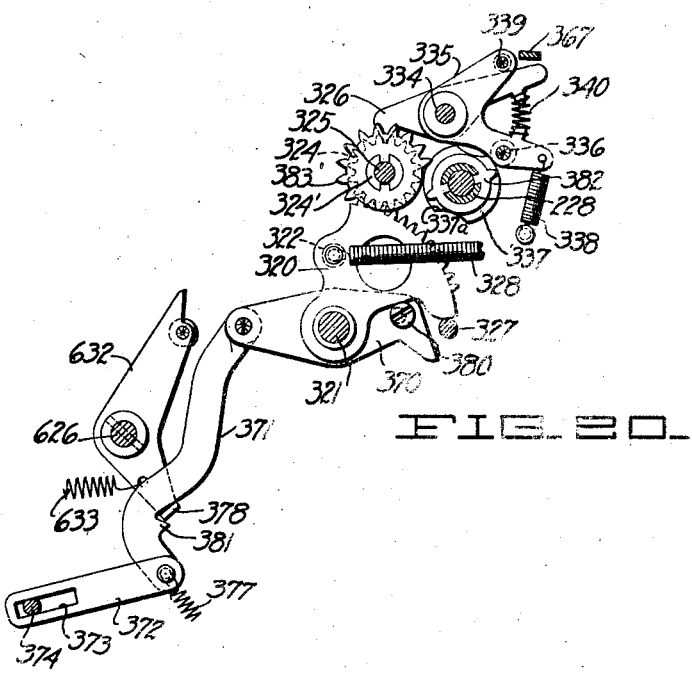
Figure 20 is a side elevational view showing part of the multiplier trip mechanism for arresting operation of the main clutch.

An adjustable eccentric screw 380 (Figure 20) is mounted on the lever 370 with its head underlying the sector gear 320, and when the gear 320 is in its home position the lever 370 is held rocked clockwise against the action of the spring 377 in the position illustrated in Figure 20, in which case a lip 381 formed on the link 371 engages the under edge of ear 378 and holds the latch 632 rocked away from the ear 617 (Figure 10) of the main clutch dog 247.

Now, as the sector gear 320 is rocked counterclockwise during a selection, as was described above, the spring 377 causes the lever 370 to follow the sector gear and draws the link 371 downwardly while the spring 633 pulls the latch 632 into latching engagement with the dog 247. The latch 632 therefor holds the dog 247 away from the main clutch until the sector gear 320 is again forced into its home position. As it enters the home position, however, it engages stud 380 and rocks the lever 370 raising the lip 381 of link 371 against the ear 378 of latch 632 to release the main clutch dog and thus effect disengagement of the main clutch.

The means for stepping the gear 324 and sector gear 320 toward home position comprises a two-toothed gear 382 keyed on the hub 228 (Figures 3 and 20) of the main clutch, and adapted to mesh with a mutilated gear 383 keyed on the hub 324' of the selection gear 324. It will be noted that the teeth of gear 383 have the same angular spacing as have the teeth of gear 324, or in other words the angular spacing of the teeth of gear 383 is equal to the angular increments of movement imparted to the selection gear 324 for each unit of a multiplier digit. Therefore, in view of the fact that a main clutch cycle is completed in one-half revolution of the main clutch, the gear 382 will step the gear 383 and consequently the gears 324 and 320 backward one tooth or increment toward their home position during each main clutch cycle.

The cam disc 337 is so arranged that one of the two diametrically opposed notches 337a therein will move into alignment with the roller 336 on lever 335 just as a tooth of the gear 382 moves into mesh with the gear 383. Therefore, the spring 338 may rock the lever 335 and thereby the pawl 326 out of engagement with the gear 324 so as to allow the gear 382 to drive the gear 383 backward one tooth. When operated at a relatively high speed, the spring 338 may not be sufficient of its own accord to move the pawl 326 out of pawling engagement with the gear 324, but due to the angle of incidence between the teeth of gear 324 and the pawl, the teeth will act to cam the pawl out of engagement, the notches 337a permitting this operation. Thus, as the gear 382 nears the end of its one tooth drive the disc 337 cams the lever 335 upwardly and, through the heavy spring 340, rocks pawl 326 into pawling engagement with the teeth of gear 324 so as to prevent overthrow of the gear. During this operation the spring 340, because of its stiffness, remains practically inflexible so that an overthrown tooth of gear 324 cannot cam the pawl 326 out of pawling engagement.

It will be noted that when the gears 320, 324 and 383 are in their home positions, the teeth of gear 383 will be positioned out of the path of the two toothed gear 382 so that such gear will not be actuated during main clutch operations not involving operation of the multiplier selection mechanism. As mentioned heretofore, depression of any multiplier key from "1" to "9," inclusive, is effective to cause engagement of the program clutch. This can be effected only when the depressed key is fully depressed. Pivoted at 1908 (Figure 18) to an ear on the bar 2030 is a link 2033 which is pivotally connected at the other end thereof to a link 1907 depending from a lever 2034 included in a lever system comprising levers 2034, 2035, and 2036.

Levers 2034 and 2035 are mounted on a frame pin 2037, while the lever 2036 is pivoted at 1906 to the lever 2035. A compression spring 2040 extends between the levers 2034 and 2035 to normally hold these levers apart in their relative positions illustrated in Figure 18, wherein an ear 2116 on lever 2035 engages a portion of lever 2034. Similarly, levers 2035 and 2036 are normally held in their relative illustrated positions by a compression spring 2043, in which case the lever 2036 is held against an ear 2045 on lever 2035. A lug 2046 on lever 2035 underlies the bar 2030, being held thereagainst by a spring 2056 tensioned between the lever 2035 and a frame stud, so that when the bar 2030 is forced downwardly by depression of a multiplier key, the lever 2035 is rocked counter-clockwise.

It should be noted that the control of the program clutch is effected jointly by the bar 2030 and by a key latching slide 2055 slidably mounted on the undersurface of the channel frame 2002 and movable to key latching position only upon full depression of a multiplier key so that a program clutch operation will ensue only when the key is fully depressed. This operation is effected by depression of the link 2033, one end thereof being carried by the bar 2030 and the other end thereof being carried by link 1907 and lever 2034.

As a multiplier key of any value from "1" to "9" is being depressed, the underlying bar 2030 is thereby depressed, lowering the right hand end of link 2033. Also, the lever 2035 is rocked counter-clockwise. However, during such depression, a lug 2015 on the depressed key stem 2101 passes into the corresponding slot 2016 of the latching slide 2055 and permits only a slight leftward movement of the slide. The lever 2034 has an ear 2062 engaging a notch 2092 in the latch slide 2055 and, therefore, since the lock slide prevents the lever 2034 from rocking counter-clockwise enough at this time to depress the left hand end of link 2033 the proper amount, the spring 2040 will merely yield. The slide 2055 will, at this time, have carried a notch 2057 therein out of the path of an ear 2061 on the lever 2036 preventing ear 2061 from holding slide 2055. As the depressed multiplier key reaches its lowermost position, lug 2015 passes below slide 2055 permitting the spring 2040 to expand rocking lever 2034 to move the slide 2055 leftwardly to latching position over the lug 2015 of the depressed key, and to lower the left hand end of link 2033 a sufficient amount to initiate the program clutch operation.

Figure 9:
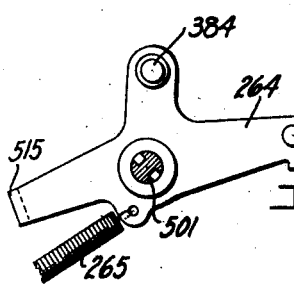
Figure 9 is a detail view of the program clutch control dog.

The means whereby the link 2033 effects a setting clutch operation comprises a lever 2047 pivoted at 1909 and having an ear 2048 overlying the link 2033 intermediate its ends. The lever 2047 is urged counter-clockwise by a light spring 1956 tensioned between the machine framework and the lever, and is connected through a pin and slot connection 1951 to a floating interponent 1952 pivoted to an arm 1953 rockable on a shaft 1954. The interponent abuts a pin 384 mounted on the program clutch dog 264 (Figures 7, 9, and 18).

When the link 2033 is lowered sufficiently at both ends thereof the lever 2047 will follow the same under the influence of a spring 1956, thus raising the interponent 1952 to a position where it is engaged by a ratchet 1957 (Figures 16 and 18) suitably coupled to the motor driven gear 362. The ratchet 1957 rocks the interponent sharply to the left, causing it to strike the stud 384 and rock the setting clutch dog 264 to institute a program clutch operation in the manner described hereinbefore.

Means are provided to release a latched multiplier key upon operation of the program clutch or the carriage shifting mechanism (not shown). A lever 2053 pivotally supported at 2059 has an extension 2054 pivoted at the upper end thereof and provided with an ear 2090 engaging a notch in the latch slide 2055. A stiff spring 2058a compressed between the lever 2053 and its extension 2054 normally holds the extension against a lug 2054b formed on the lever 2053 so that the lever and its extension ordinarily function as a unit.

A spring 1960 normally urges the lever 2058 clockwise and prevents the latching slide 2055 from drifting into latching position, the spring 1960 being weaker than the spring 2040 so as to not materially influence operation thereof. Lever 2058 is provided with an ear 2072 underlying an arm 2068 fixed on a sleeve 2094 (see also Figure 10) mounted on the shaft 101 having also secured thereon the hereinbefore mentioned cam follower lever 746. As the shaft 101 receives a half rotation at the commencement of multiplication operation, the follower 746 and, consequently, the arm 2068 are rocked counter-clockwise, the latter striking the ear 2072 to cause the lever 2058 to shift the latching slide 2055 to the right, as viewed in Figure 18, to release any latched multiplier key.

As described in detail in the above mentioned Avery Patent 2,216,659, a link 1391 is shifted to the left, as viewed in Figure 18, during each carriage shift operation and when such shift occurs as a sequence to a multiplication operation the link is guided to strike a lever 1396 pivoted at 1395 to rock the same against the action of a tension spring 1404, causing a leftwardly extending arm thereon to strike an ear 1399 on the lever 2058 to likewise rock the lever 2058 clockwise and cause the slide 2055 to release any latched multiplier key.

Means are provided to prevent relocking of a multiplier key in depressed position in the event that it is held down after the latching slide 2055 has been moved to releasing position. The above described lever 2036, pivoted on the lever 2035 at 1906, is provided with an ear 2061 adapted to engage the notch 2057 in the slide 2055 as the latter is moved to the right by the lever 2058 and to restrain the slide from returning to key locking position as long as the key is held depressed.

It will be recalled that lever 2035 is rocked counter-clockwise about its pivot 2037 due to downward movement of the parallel bar 2030 and this movement is transmitted through the spring 2043 to lever 2036, causing it to press upwardly against the latching slide 2055, thereby engaging in the notch 2057 until the operator releases the depressed key.

In order to prevent the lever 2036 from engaging its ear 2061 in the notch 2057 when an operator is pressing down on a latched-up key and the latch slide 2055 is moved to the right to release a previously depressed key, a pawl 2069 is provided, the function of which under the above condition will be described later. Pawl 2069 is pivoted on a depending portion of the bar 2030 and is pressed against a limit stop provided by the head of the pivot pin 1908, by a spring 2070 compressed between the pawl and the bar 2030. In case of the normal depression of an initial multiplier key, the pawl 2069 is carried downwardly and forwardly by bar 2030 and in doing so engages an ear 2078 on the lever 2036, rocking the lever clockwise about its supporting pin 1906 and thus moving it out of cooperative relationship with the slide.

Obviously, the pawl 2069 must release the lever 2036 before the next oscillation of the key release lever 2058 in order to insure against relocking of the same key in the event it is being held down by the operator. This releasing action is effected by a lever 2079 pivoted at 1152 and provided at its upper end with a pin 2095 adapted to engage a pointed extension 2096 on the pawl 2069 to rock the pawl against the action of a spring 2070 and release the lever 2036.

As disclosed in detail in the above Avery Patent 2,216,659, the mechanism (not shown herein) for dipping the accumulator gears into mesh with the actuating gears during the setting clutch cycle is effective to rock the lever 2079 clockwise to cause the pawl 2069 to release lever 2036 before the lock bar 2055 is retracted by the lever 2058.

As previously mentioned the principal use of the foregoing mechanism occurs when a multiplier key is latched up. For instance, if the machine is running out the multiplication instituted by the depression of one multiplier key and the operator has depressed and latched down a second key to store the next succeeding multiplier digit, all other multiplier keys will then be latched up until the selection has been taken off of the latched down key. When the operator is pressing down on a latched up key and the latch slide 2055 is moved to the right to release a latched down key to permit the same to rise and to permit the new key to be depressed, the member 2036 tends to move into latching engagement with notch 2057 of slide 2055 to hold the same in unlatching position so as to prevent operation of the setting clutch. In order to prevent this condition, the above mentioned pawl 2069, upon being raised by the bar 2030 as it follows the rising key, snaps into latching position over the ear 2078 of member 2036 by means of its spring 2070 and consequently, as the newly depressed key moves downward it carries bar 2030 and pawl 2069 downward also, the latter now rocking member 2036 to release slide 2055 so that it may be moved forward to latch the various keys and cause initiation of operation of the setting clutch.

In the event that operation of the setting clutch is effected by a control key other than a multiplier key, while a multiplier key is inadvertently held in partially depressed condition wherein the lever 354 (Figure 17) is engageable with the shoulder 356 of the selection bar 312, the setting clutch would effect operation of the multiplier selection mechanism resulting, in general, in an erroneous operation. To prevent such a condition from arising, the hereinbefore mentioned latch 333, pivoted on the frame stud 315, is provided. This latch has an ear 390 thereon held in engagement with the rightmost edge of a notch formed in the latch slide 2055 by the tension spring 331, and when the latch slide is in its illustrated position the spring 331 is allowed to hold the latch 333, as shown, with a blocking ear 391 thereon positioned in front of the projection 329 on the selection bar 312. Therefore, a multiplier key must be fully depressed to a position wherein it enables the latch slide 2055 to move to latching position before the selection bar 312 can be moved to selecting position.

As described in detail in the above mentioned Boyden et al. patent, means (not shown herein) operable in response to disengagement of the main clutch are provided to restore the various actuating mechanisms to their normal illustrated positions in readiness for a new operation.

*Short-cut multiplication*

The machine of the present invention is provided with a "short-cut" control mechanism effective to institute negative multiplication for certain calculations, such as where it is desired to multiply by a minus quantity.

The short-cut mechanism is controlled by a settable key 1120 (Figure 21) provided with a slotted key stem guided over fixed pins 387 and 388. Provided on the key stem is an ear 1123 overlying a lever 1124 pivoted at 1126 and underlying an ear 1125 formed on the hereinbefore mentioned reverse unit control lever 545. Upon depression of the short-cut key 1120 to its set position, the lever 1124 is rocked thereby to rock the hereinbefore described lever 545 clockwise so as to control setting of the reverse unit 251 (Figures 12, 13, and 16) for subtraction.

The short-cut key 1120 is locked in set position whenever depressed thereto by a latch 400 pivoted on a shaft 752. The latch 400 is urged counter-clockwise by a spring 402 tensioned between an ear on the upper end of the latch and a frame stud 403 so as to position a shoulder thereon over a shelf 401 on the short-cut key stem when the same is depressed.

The key 1120 is released at approximately the end of a succeeding setting phase of the program clutch by a release lever 404 pivoted on the stud 403 and overlying an ear 405 on the lower end of the latch 400. The release lever 404 is provided with a roller 406 lying in front of an arm 774 which is pinned on a shaft 752 (see also Figure 10). Also pinned on the shaft 752 is an arm 750 connected by a link 748 to the hereinbefore described cam follower 746 so that near the end of a setting phase of the program clutch, rocking movement of the follower 746 is transmitted to the release lever 404 rocking the same clockwise and effecting a similar rocking movement of the latch 400, whereupon a spring 407 tensioned between the pin 387 and an ear on the short-cut key stem retracts the key upwardly to its illustrated position, allowing the reverse unit control lever 545 to return to a "positive" setting.

Means are provided to prevent relatching of the short-cut key in the event that the operator holds the key down during the unlatching period of a succeeding program clutch cycle. This means comprises a blocking latch 408 pivoted on the stud 403 and urged clockwise by a spring 409, tensioned between the latch 408 and the pin 387. When the latch 400 is rocked clockwise by the release lever 404 under the influence of the cam 607 (Figure 10) to release the shelf 401, it is overthrown sufficiently to enable a shoulder on the blocking latch 408 to be moved into blocking relation with the ear on the upper end of the latch 400, preventing the same from again relatching the shelf 401 as long as the operator is holding the key down. When the operator releases the key, the shelf 401 strikes the tail 410 of the latch 408 and causes the same to release the latch 400, this action, of course, occurring after the shelf 401 has moved above the level of the latching shoulder of latch 400.

In the event that the short-cut key 1120 has been depressed inadvertently, it may be released by a stop key 411 guided intermediately over a frame pin 412 and pivotally connected at 413 to a bell crank 414, pinned on a rockable shaft 415. The bell crank 414 is loosely connected to the latch 400 through a wire link 416. A spring 417 tensioned between the pin 412 and the pivot 413 normally holds the stop key 411 in a raised position, and also holds the bell crank 414 in a position wherein enough lost motion is provided between the link 416 and latch 400 to enable the latch to engage the shelf 401 of the short-cut key stem. However, upon depression of the stop key 411 the bell crank 414 is rocked sufficiently to cause the link 416 to throw the latch 400 out of latching engagement with shelf 401.

Division control

As described in detail in the above Avery Patent 2,216,659, the machine of the present invention is provided with a division control mechanism for controlling the machine so as to effect automatic performance of division calculations.

In such calculations the dividend is set up in the accumulator in the well known manner, the divisor is set up on the keyboard, and a division initiating key 916 (Figure 22) is depressed. As the division key moves downwardly, a roller 974 thereon moves from in front of the head of a division control lever 975 forming a part of the hereinbefore described division control lever assembly 978 rockable about the shaft 976, thereby allowing a strong tension spring 977 to rock the entire lever assembly clockwise to initiate operation of the program clutch 262 and the division control mechanism (not shown).

Means are provided which are operable by the division control lever 975 for initiating operation of the program clutch with consequent initiation of operation of the main clutch. A roller 979 mounted on the lever 975 overlies a depressible operating bar 503 (Figure 23) supported by a parallel link arrangement comprising a lever 504 fulcrumed at 506 and a plate 505 fulcrumed at 507. Spring means (not shown) are provided to maintain the bar 503 in its illustrated raised position, however, the spring 977 is strong enough to enable the lever 975 to depress the bar 503 and thereby lower a setting clutch control bell crank 512 pivoted on the plate 505 at 513 and urged counter-clockwise by a spring 516 tensioned between the bar 503 and the bell crank. The spring 516 normally holds the bell crank 512 with a notch on the lower end thereof embracing a lateral ear 515 on the program clutch dog 264 so that depression of the bar 503 will cause the bell crank 512 to rock the program clutch dog 264 counter-clockwise to initiate a program clutch cycle. During the setting phase of the program clutch cycle, means (not shown) operable by the program clutch rock the bell crank out of engagement with the ear 515 to release dog 264 which terminates operation of the program clutch at the conclusion of its setting phase.

The operation of the machine in division consists of successive subtractions of the divisor from the digits of the dividend which are registered in the orders of the accumulator aligned with the orders of the divisor as set in the keyboard until the remainder in the accumulator becomes smaller than the divisor. It will therefore be seen that during the greater part of the time, the main clutch will have to be engaged throughout a plurality of cycles and the heretofore described main clutch dog latch 632 (Figures 10, 20, and 22) is provided to insure such continued multi-cyclic operation of the main clutch, means (not shown) being provided to release the latch 632 when the remainder becomes less than the divisor. Therefore, means are provided to release the hereinbefore described latch disabling link 371 (Figures 20 and 22) from the latch 632. This is accomplished by the stud 374 carried by the division control lever assembly 375 and movable within the elongated slot 373 in the link 372.

As described in the Avery Patent 2,216,659, during the portions of a division operation in which multicyclic operation of the main clutch may take place, the division control lever 975 is held rocked clockwise from its illustrated position and, therefore, the pin 374 is engaged with the left end of the slot 373 to hold the links 371 and 372 leftward from their illustrated positions so that the spring 633 may become effective to rock the latch 632 into latching engagement with the main clutch dog, permitting the main clutch to remain engaged throughout a plurality of cycles if such operation is permitted by the division control mechanism. During the portions of a division operation in which the lever 975 is in the position shown in Figure 22, only a single cycle of operation of the main clutch, at most, is desired, and at such times latch 632 is disabled by link 371 as hereinbefore described.

I claim:

1. In a calculating machine having an accumulating mechanism, an actuating mechanism therefor, a motor, means comprising a cyclically operable main clutch for connecting said actuating mechanism to said motor, means for initiating operation of said main clutch comprising a second clutch operable by the motor, means including a control member movable to effective position for arresting operation of said main clutch, a series of depressible value keys, means for initiating operation of said second clutch, settable means controlled by said keys for moving said clutch control member away from said effective position a number of increments corresponding to the value of a depressed one of said keys, and means operable by said main clutch for moving said control member toward said effective position at a rate of one of said increments for each cycle of operation thereof; the combination comprising normally uncoupled drive means for said settable means operable by said second clutch, and means responsive to depression of one of said keys for operatively connecting said drive means to said settable means.

2. In a calculating machine having an accumulating mechanism, an actuating mechanism therefor, a motor, means comprising a cyclically operable main clutch for connecting said actuating mechanism to said motor, means for initiating operation of said main clutch, means for arresting operation of said main clutch including a control member movable to and from effective position, a series of depressible value keys, a second clutch operable by said motor, and means for initiating operation of said second clutch; the combination comprising settable means actuated by said second clutch and controlled by a depressed one of said depressible keys for moving said clutch control member from said effective position a number of increments of movement corresponding to the value of said depressed key, pawling means for preventing movement of said control member, means operable by said second clutch for sequentially releasing and reenabling said pawling means, means operable by said main clutch for advancing said clutch control member towards said effective position at the rate of one of said increments for each cycle of operation thereof, and means operable by said main clutch for releasing said pawling means.

3. In a calculating machine having an accumulating mechanism, an actuating mechanism therefor, a motor, means comprising a cyclically operable main clutch for connecting said actuating mechanism to the motor, means for initiating operation of said main clutch, means for arresting operation of said main clutch including a control member movable to and from effective position, and a series of depressible value keys; the combination comprising means responsive to depression of one of said keys for moving said clutch control member from said effective position a number of increments of movement corresponding to the value of said depressed key, pawling means for restraining movement of said control member, means operable in response to said depression of said key for releasing said pawling means, means operable by said main clutch for advancing said clutch control member toward said effective position at a rate of one of said increments for each cycle of operation thereof, and means controlled by said main clutch for releasing said pawling means upon movement of said control member by said advancing means.

4. In a calculating machine having an accumulating mechanism, an actuating mechanism therefor, a motor, means comprising a cyclically operable main clutch for connecting said actuating mechanism to the motor, means for initiating operation of said main clutch, means for arresting operation of said main clutch including a control member movable to and from effective position, and a series of depressible value keys; the combination comprising means responsive to depression of one of said keys for moving said clutch control member from said effective position a number of increments of movement corresponding to the value of said depressed key, pawling means for restraining movement of said control member, means operable in response to depression of said key for releasing said pawling means, means operable by said main clutch for intermittently engaging and advancing said clutch control member toward said effective position at a rate of one of said increments for each cycle of operation thereof, and a cam operatively connected to said last mentioned means for moving said pawling means into pawling engagement with said control member on movement of said advancing means out of engagement therewith and for permitting said pawling means to be disengaged from said control member on movement of said advancing means into engagement therewith.

5. In a calculating machine having an accumulating mechanism, an actuating mechanism therefor, a motor, means comprising a cyclically operable main clutch for connecting said actuating mechanism to said motor; means for initiating operation of said main clutch, means including a control member movable to an effective position for arresting operation of said main clutch; a depressible key, a second clutch operable by said motor, and means for initiating operation of said second clutch; the combination comprising settable means actuated by said second clutch and controlled by said key upon depression thereof for moving said clutch control member from said effective position, pawling means for restraining said control member from movement, means operable by said second clutch for sequentially releasing and reenabling said pawling means, means operable by said main clutch for moving said clutch control member to the effective position as aforesaid, and means operable by said main clutch for releasing said pawling means.

6. In a calculating machine having an accumulating mechanism, an actuating mechanism therefor, a motor, means comprising a cyclically operable main clutch for connecting said actuating mechanism to the motor; means for initiating operation of said main clutch, means including a control member movable to effective position for arresting operation of said main clutch; and a depressible key; the combination comprising means responsive to depression of said key for moving said control member from said effective position, pawling means for restraining said control member from movement, means operable in response to said depression of said key for releasing said pawling means, a device operable by said main clutch for moving said control member to said effective position as aforesaid, and means controlled by said main clutch for releasing said pawling means upon movement of said control member by said device.

7. In a calculating machine having an accumulating mechanism, an actuating mechanism therefor, a motor, means comprising a cyclically operable main clutch for connecting said actuating mechanism to the motor, means for initiating operation of said main clutch, means including a control member movable to effective position for arresting operation of said main clutch, and a series of depressible value keys; the combination comprising means responsive to depression of one of said keys for moving said clutch control member from said effective position a number of increments of movement corresponding to the value of said depressed key, pawling means for restraining movement of said control member, means operable in response to depression of said key for displacing said pawling means from pawling position, spring means other than said last mentioned means for moving said pawling means from pawling position, means operable by said main clutch for intermittently engaging and advancing said clutch control member toward said effective position at the rate of one of said increments for each cycle of operation thereof, and means operable by said main clutch for moving said pawling means into pawling position upon movement of said advancing means out of engagement with said control member and for permitting said spring to displace said pawling means from pawling position upon movement of said advancing means into engagement with said control member.

8. In a calculating machine having an accumulating mechanism, an actuating mechanism therefor, a motor, means comprising a cyclically operable main clutch for connecting said actuating mechanism to said motor, means for initiating operation of said main clutch comprising a second clutch operable by said motor, means including a control member movable to effective position for arresting operation of said main clutch, a key, means for initiating operation of said second clutch, settable means controlled by said key for moving said clutch control member away from said effective position, and means operable by said main clutch for moving said control member to said effective position; the combination comprising normally uncoupled drive means for said settable means operable by said second clutch, and means responsive to said key upon depression thereof for coupling said drive means to said settable means.

WALTER E. MATHI.